(No Model.)
J. VON DER POPPENBURG.
GALVANIC DRY BATTERY.
No. 504,746. Patented Sept. 12, 1893.
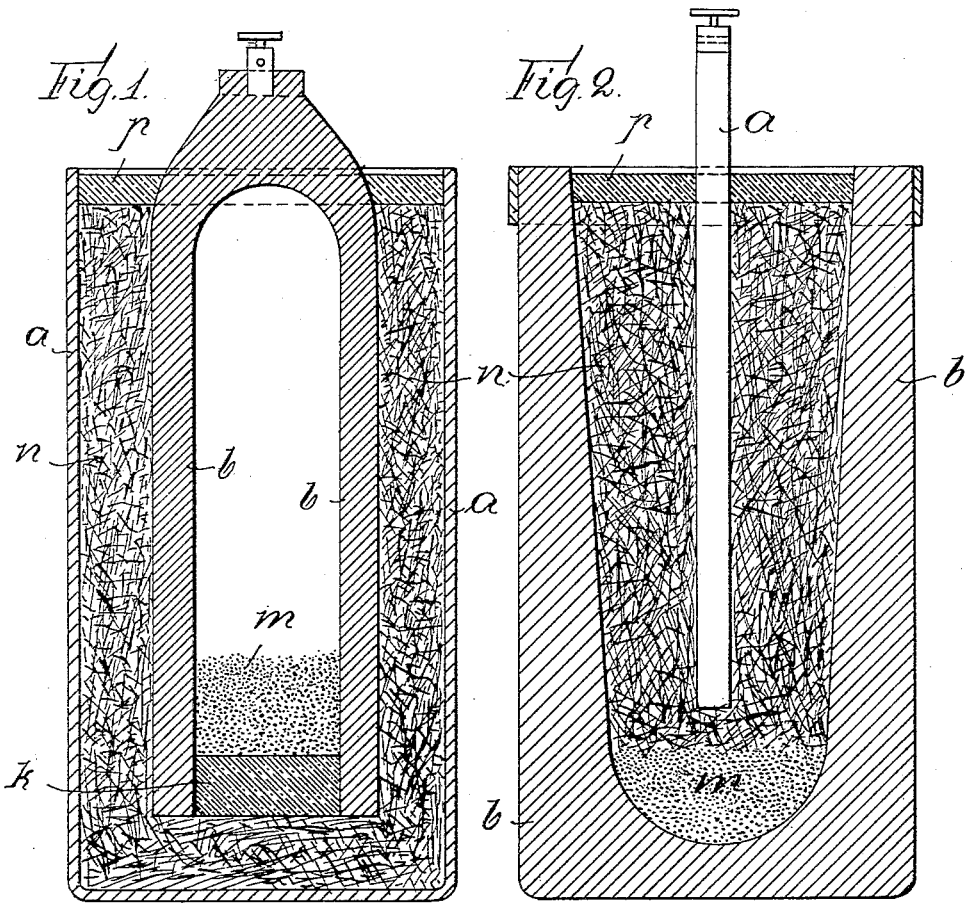
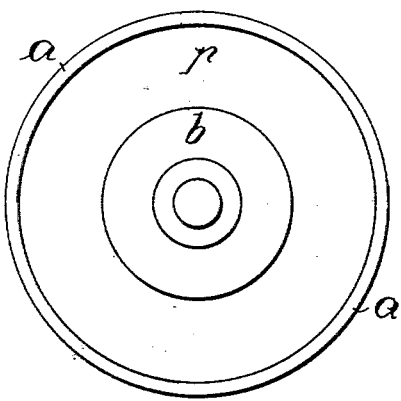
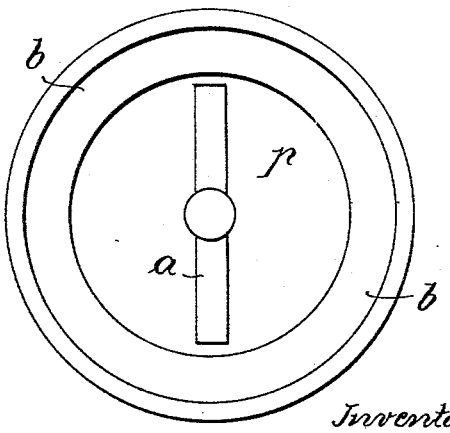
Witnesses:
Carl Rossbach.
E. Kayser.
Inventor:
John von der Poppenburg.
by Robert _____
Attorney.

UNITED STATES PATENT OFFICE.

JOHN VON DER POPPENBURG, OF CHARLOTTENBURG, ASSIGNOR TO CARL CHRISTIAN LESENBERG, OF ROSTOCK, GERMANY.

GALVANIC DRY BATTERY.

SPECIFICATION forming part of Letters Patent No. 504,746, dated September 12, 1893.

Application filed October 11, 1892. Serial No. 448,599. (No model.)

*To all whom it may concern:*

Be it known that I, JOHN VON DER POPPENBURG, a subject of the King of Prussia, German Emperor, and a resident of Charlottenburg, near Berlin, in the Kingdom of Prussia, German Empire, have invented certain new and useful Improvements in Galvanic Dry Batteries, of which the following is an exact specification.

My invention relates to improvements in galvanic dry batteries, and consists first in employing a novel filling material of great cheapness, as hereinafter described whereby the constancy of the current yielding is preserved for a long time.

My invention secondly consists in soaking the carbon electrode in a solution of hydroxide of chrome, prepared in a particular manner, to be described hereinafter.

My invention will be more readily understood by reference to the accompanying drawings, in which—

Figure 1 is a central elevation of my improved dry battery. Fig. 2 is a similar view of a modification. Figs. 3 and 4 are plan views corresponding to Figs. 1 and 2 respectively.

Similar letters denote similar parts throughout the several views.

In Fig. 1 *a* is a zinc vessel or cup forming the cathode of the cell and containing the exciting substance *n*, the composition and preparation whereof will be described hereinafter. In the center of the said zinc cup *a* I place the cylindrical hollow carbon electrode *b*, which is made tapering at its upper end, as shown. The opening at the bottom of the carbon cylinder *b* is closed up by a cork *k*, but previously I insert a small quantity of hydroxide of chrome, as shown at *m*, prepared in a manner presently to be described. The carbon electrode is impregnated with a solution of said hydroxide of chrome. When all parts are inserted in their right position, the cell is closed at the top by means of a cork or similar substance made impervious by a coating of pitch, as shown at *p*.

In Figs. 2 and 4 I have shown a modification in which the positions of the metal and carbon electrodes have been reversed. In all other respects the construction of the cell is the same as before described, and will be readily understood by the aid of the letters of reference marked on the drawings.

In carrying my invention into effect, I fill the cells with finely chopped or ground fibrous materials, such as straw, chaff, and other vegetable matters; these substances, and this is a feature of my invention, are scalded in hot water, and may then be used for filling the cells. I prefer to mix the chopped straw or other vegetable matter with hydrates of carbon, such as dextrine, glucose or starch. This is another characteristic feature of my invention, and in this case I add such a quantity of water that the entire mass is moist in itself, yet will not exude any water or moisture. The addition of hydrates of carbon is however not absolutely necessary.

A further characteristic of my invention consists in impregnating and partly filling the carbon cylinder with a hydroxide of chrome prepared in a particular manner. This hydroxide of chrome is prepared in the following manner: I take common bichromate of potash, dissolve it in hot water in such a degree, that the solution is perfectly saturated. Then I pour this solution in sulphuric acid, and precipitate thereby hydroxide of chrome, which is again dissolved in water. The carbon cylinder is steeped in this solution, so that it is soaked thoroughly with hydroxide of chrome, and I also fill a small quantity of the precipitate into the hollow of the carbon cylinder, which is finally closed by means of a cork, as described.

The filling material constituted by the scalded chopped straw or other vegetable matter is humid enough to effect the production of a current, but will not give off any moisture.

My improved dry battery yields a very constant current and remains active for a very long time, especially, if it is given a period of repose from time to time.

I do not confine myself to any particular construction of the battery, and my invention merely consists in the employment of the new filling materials. Therefore,

What I claim, and desire to secure by Letters Patent of the United States, is—

As a filling material for galvanic dry batteries finely chopped or ground vegetable substances, and especially chopped straw, mixed with hydrates of carbon, such as starch, glucose, dextrine, and the like, in combination with a solution of hydroxide of chrome, substantially as and for the purpose set forth.

In testimony whereof I have signed this specification in the presence of two subscribing witnesses.

JOHN VON DER POPPENBURG.

Witnesses:
L. A. EDWARDS,
W. HAUPT.